(12) United States Patent
Carpenter

(10) Patent No.: US 10,426,155 B2
(45) Date of Patent: Oct. 1, 2019

(54) SMALL CHEWING MAMMAL DETERRENT APPARATUS AND METHOD

(71) Applicant: Wayne Carpenter, Omak, WA (US)

(72) Inventor: Wayne Carpenter, Omak, WA (US)

( * ) Notice: Subject to any disclaimer, the term of this patent is extended or adjusted under 35 U.S.C. 154(b) by 59 days.

(21) Appl. No.: 15/497,069

(22) Filed: Apr. 25, 2017

(65) Prior Publication Data

US 2018/0303082 A1    Oct. 25, 2018

(51) Int. Cl.
*A01M 29/10* (2011.01)
*F21V 23/00* (2015.01)
*F21V 23/04* (2006.01)
*A01K 29/00* (2006.01)

(52) U.S. Cl.
CPC ........... *A01M 29/10* (2013.01); *F21V 23/004* (2013.01); *A01K 29/005* (2013.01); *F21V 23/04* (2013.01)

(58) Field of Classification Search
CPC ...... A01K 29/005; A01M 29/10; F21V 23/04; F21V 23/004
See application file for complete search history.

(56) References Cited

U.S. PATENT DOCUMENTS

| | | | | |
|---|---|---|---|---|
| 4,984,140 A | * | 1/1991 | Ellion | F21L 4/022 362/187 |
| 7,537,358 B2 | * | 5/2009 | De Ginto | A01M 29/10 362/276 |
| 9,027,513 B2 | * | 5/2015 | Wu | A01M 29/00 119/712 |
| 9,560,837 B1 | * | 2/2017 | Suntych | A01K 45/00 |
| 9,675,059 B2 | * | 6/2017 | Waldman | A01M 31/002 |
| 2001/0049369 A1 | | 12/2001 | Jablonski et al. | |
| 2010/0008098 A1 | | 1/2010 | Vernon | |
| 2013/0249693 A1 | * | 9/2013 | Neal | A01M 29/10 340/573.2 |

(Continued)

FOREIGN PATENT DOCUMENTS

CN    101327766 A    12/2008
CN    204409379        6/2015

OTHER PUBLICATIONS

Rid-A-Rat, "About Us", http://www.rid-a-rat.com/About-us.html, retrieved Apr. 24, 2017.

(Continued)

*Primary Examiner* — Anh T Mai
*Assistant Examiner* — Arman B Fallahkhair
(74) *Attorney, Agent, or Firm* — Wells St. John P.S.

(57) ABSTRACT

A deterrent apparatus for small chewing mammals having open root incisor teeth that continually grow is provided. The apparatus includes an array of green light emitting diodes, a power supply, and control circuitry. The control circuitry includes power conversion circuitry coupled between the array of diodes and the power supply to regulate and control operation of the diodes. The control circuitry is configured to intermittently illuminate and deluminate the array of green light diodes. The control circuitry is configured to drive the LEDs to generate a visual output of luminous energy having reciprocity between visual intensity (I) and time of stimulus duration (T) to impart a disturbing psychophysical response via photoreceptors of a small chewing mammal that realize a constant photoreceptor effect from 0.00173 to 0.0518 seconds. A method is also provided.

20 Claims, 4 Drawing Sheets

(56) References Cited

U.S. PATENT DOCUMENTS

2014/0245969 A1    9/2014    Wu

OTHER PUBLICATIONS

Rid-A-Rat, "Products", http://www.rid-a-rat.com/order-here.html, retrieved Apr. 24, 2017.
Rid-A-Rat, "Specifications", http://www.rid-a-rat.com/Specifications.html, retrieved Apr. 24, 2017.
"Rods (eye)", Psychology Wiki (FANDOM powered by Wikia.pdf) [online], retrieved on May 20, 2019. Retrieved from the Internet: <https://psychology.wikia.org/wiki/Rods_%28eye%29>.
Organisciak et al., "Retinal Light Damage: Mechanisms and Protection", NCBI, Published online Dec. 3, 2009, retrieved on May 20, 2019. Retrieved from the Internet: <https://www.ncbi.nlm.nih.gov/pmc/articles/PMC2831109/>.

* cited by examiner

SMALL CHEWING MAMMAL DETERRENT APPARATUS AND METHOD

TECHNICAL FIELD

This disclosure pertains to animal chewing deterrent apparatus and methods. More particularly, this disclosure relates to deterrent apparatus and methods for small chewing mammals having open root incisor teeth that continually grow.

BACKGROUND

Attempts have been made to capture, kill and/or deter rodents and other small chewing mammals from causing damage to components of machines, vehicles, and other devices that are exposed to environments where such animals can gain access to the device and cause damage that is significant and costly to repair and can possibly render the device inoperable. Recently, traditional plastic wire insulation coatings have in some cases been replaced with more environmentally friendly materials, such as soy-based products, in an effort to increase biodegradability, but this has purportedly raised incidence of chewing by mammals. Accordingly, improvements are needed to deter damage from chewing mammals to insulated wire harnesses and wires.

SUMMARY

A small chewing mammal deterrent apparatus and method are provided.

According to one aspect, a deterrent apparatus for small chewing mammals having open root incisor teeth that continually grow is provided. The apparatus includes an array of green light emitting diodes, a power supply, and control circuitry. The control circuitry includes power conversion circuitry coupled between the array of diodes and the power supply to regulate and control operation of the diodes. The control circuitry is configured to intermittently illuminate and deluminate the array of green light diodes. The control circuitry is configured to drive the LEDs to generate a visual output of luminous energy having reciprocity between visual intensity (I) and time of stimulus duration (T) to impart a disturbing psychophysical response via photoreceptors of a small chewing mammal that realize a constant photoreceptor effect from 0.00173 to 0.0518 seconds.

According to another aspect, a deterrent apparatus for small chewing mammals is provided. The apparatus includes a distributed array of green light emitting diodes (LEDs), a power supply, control circuitry, and a temperature sensor. The control circuitry includes timing circuitry, temperature control circuitry, and an LED driver. The timing circuitry is coupled between the array of diodes and the power supply to regulate and control operation of the diodes. The timing circuitry is configured to intermittently illuminate and deluminate the array of green light diodes. The LED driver is coupled between the LEDs and the timing circuitry and is configured to maintain substantially constant power delivery to each of the LEDs. The temperature sensor is signal coupled with the temperature control circuitry to detect ambient temperature in an environment. The control circuitry is configured to drive the LEDs with the power supply such that luminance and time of illumination are reciprocal so as to generate with a given total luminous energy a disturbing psychophysical response from a small chewing mammal and realize a constant photoreceptor effect from 0.00173 to 0.0518 seconds.

According to yet another aspect, a method is provided for deterring small chewing mammals. The method includes: providing a distributed array of green light emitting diodes (LEDs) in an environment having equipment at risk of chewing damage from small chewing mammals, a power supply, and control circuitry; and intermittently illuminating and deluminating the array of green LEDs within the environment for an illumination interval of between 1 and 100 milliseconds and a frequency of between 0.2 and 5 Hertz.

DETAILED DESCRIPTION OF THE ILLUSTRATED EMBODIMENTS

This disclosure is submitted in furtherance of the constitutional purposes of the U.S. Patent Laws "to promote the progress of science and useful arts" (Article 1, Section 8).

Figure 1:
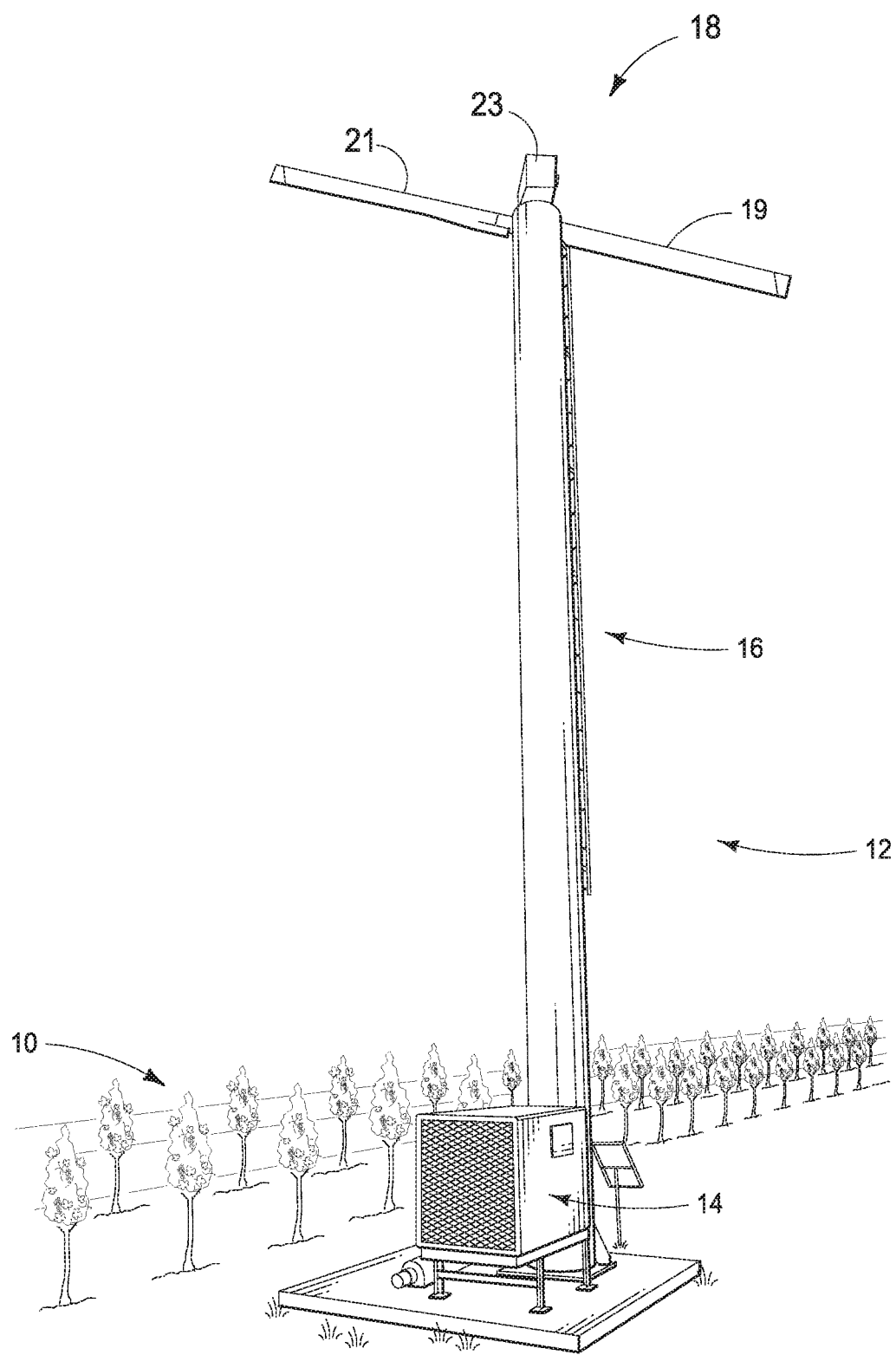
FIG. 1 is a perspective view of one version comprising an orchard wind generation machine having a small chewing mammal deterrent apparatus and method for deterring small chewing mammals having open root incisor teeth, such as rodents, from chewing electrical and other components of the machine and illustrating environment according to one implementation.

FIG. 1 illustrates a small chewing mammal deterrent apparatus 10 in the form of a rodent deterrent apparatus, according to one implementation. More particularly, deterrent apparatus 10 is provided on an orchard wind machine 12 resident within an orchard, such as a vineyard. The deterrent apparatus 10 is configured within an engine housing 14 that selectively powers via stationary tower 16 a wind generator 18 comprising a pair of opposed blades 19 and 21 and a drive head assembly 23. In some cases, drive head assembly is a stationary assembly. In other cases, drive head assembly 23 is an oscillating drive head assembly. In operation, deterrent apparatus 10 generates a specific source of illumination comprising an array of light that annoys small chewing mammals, such as rodents, having open root incisor teeth that continually grow. Such mammals are known to incessantly chew on components within buildings, equipment bays, sheds, vehicles, housings and other storage systems, such as wiring and electrical components.

In operation, orchard wind machine 12 is operated when specific meteorological conditions are detected, such as conditions that might generate frost or freezing conditions that could damage a crop. Over the course of a year, such machine 12 usually sits dormant and not in use, and is exposed to and accessible by small chewing rodents that can chew on components of machine 12, causing damage and rendering it inoperative and/or unreliable. Furthermore, such events become costly and disruptive to operation. However, deterrent apparatus 10 is configured to efficiently provide a year-round deterrence to such damage.

Figure 2:
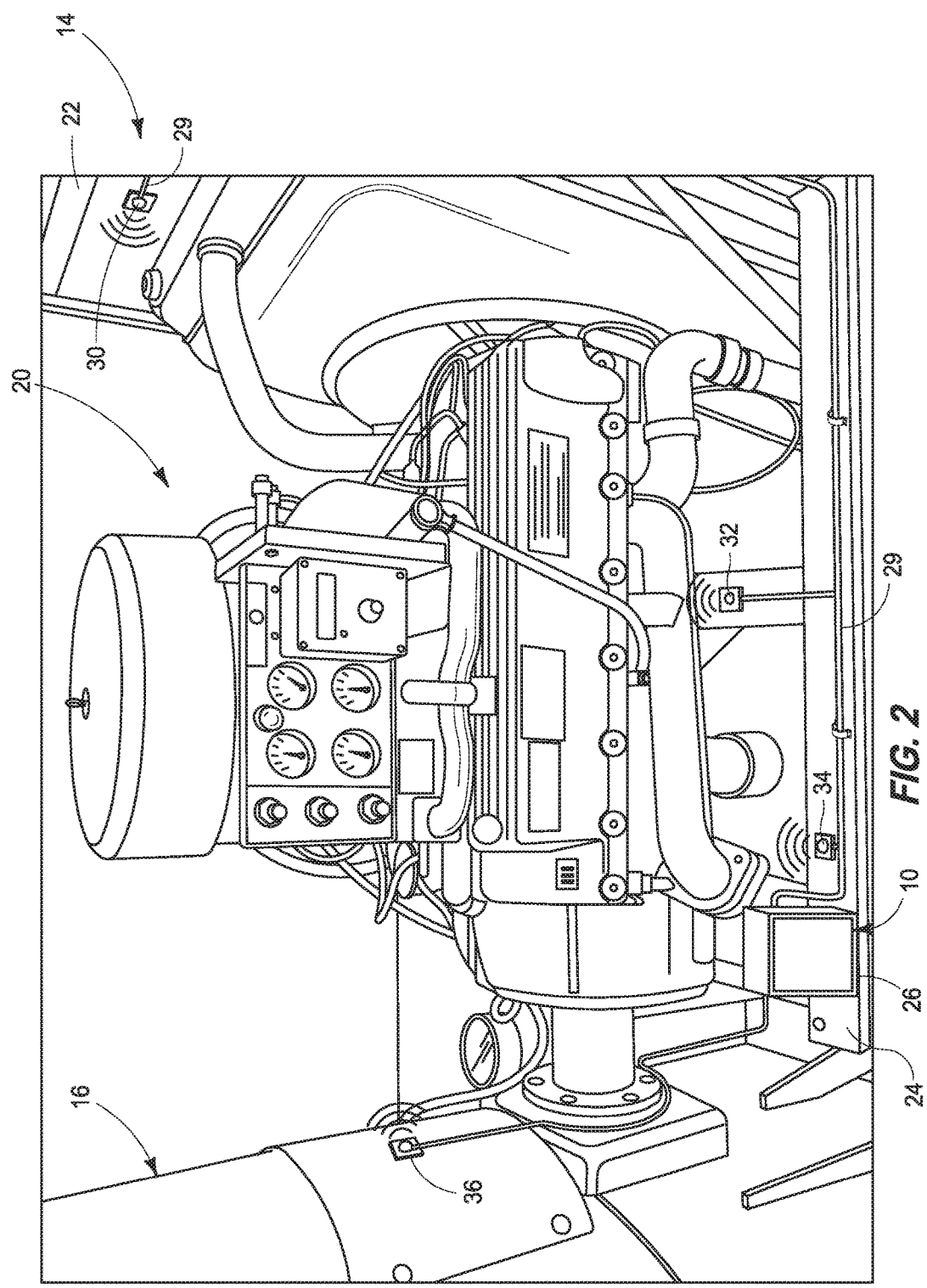
FIG. 2 is an enlarged perspective view of an internal combustion engine within an engine hood of the orchard wind generator.

FIG. 2 shows one implementation of deterrent apparatus 10 about engine 20 with the engine housing 14 removed (not shown). More particularly, an array of green light emitting diodes 30, 32, 34 and 36 are distributed in a spaced-apart array within housing 14 and about engine 20 to be intermittently illuminated and deluminated in an effort to annoy rodents and small chewing mammals that might otherwise occupy and damage components within housing 20. A control housing 26 is affixed onto a frame member 24 that supports engine 20. A wiring harness 29 delivers a supply of electrical power to each light emitting diode 30, 32, 34 and 36 in parallel to supply power at predetermined time intervals and for predetermined durations in a manner that optimizes visual and neural disturbance to such small chewing mammals in an effort to drive them from within housing 14. Optionally, such diodes can be connected in series. Although shown with an array of four green light emitting diodes, it is understood that a single diode can be used in situations where such single diode will effectively emit light covering a full area of concern for a specific piece of equipment. Likewise, any number of diodes can be provided in a distributed array from two, three, four, or more, where such an array is necessitated by a desire to fully illuminate a region where equipment is placed at risk of chewing damage from small chewing mammals.

Figure 3:
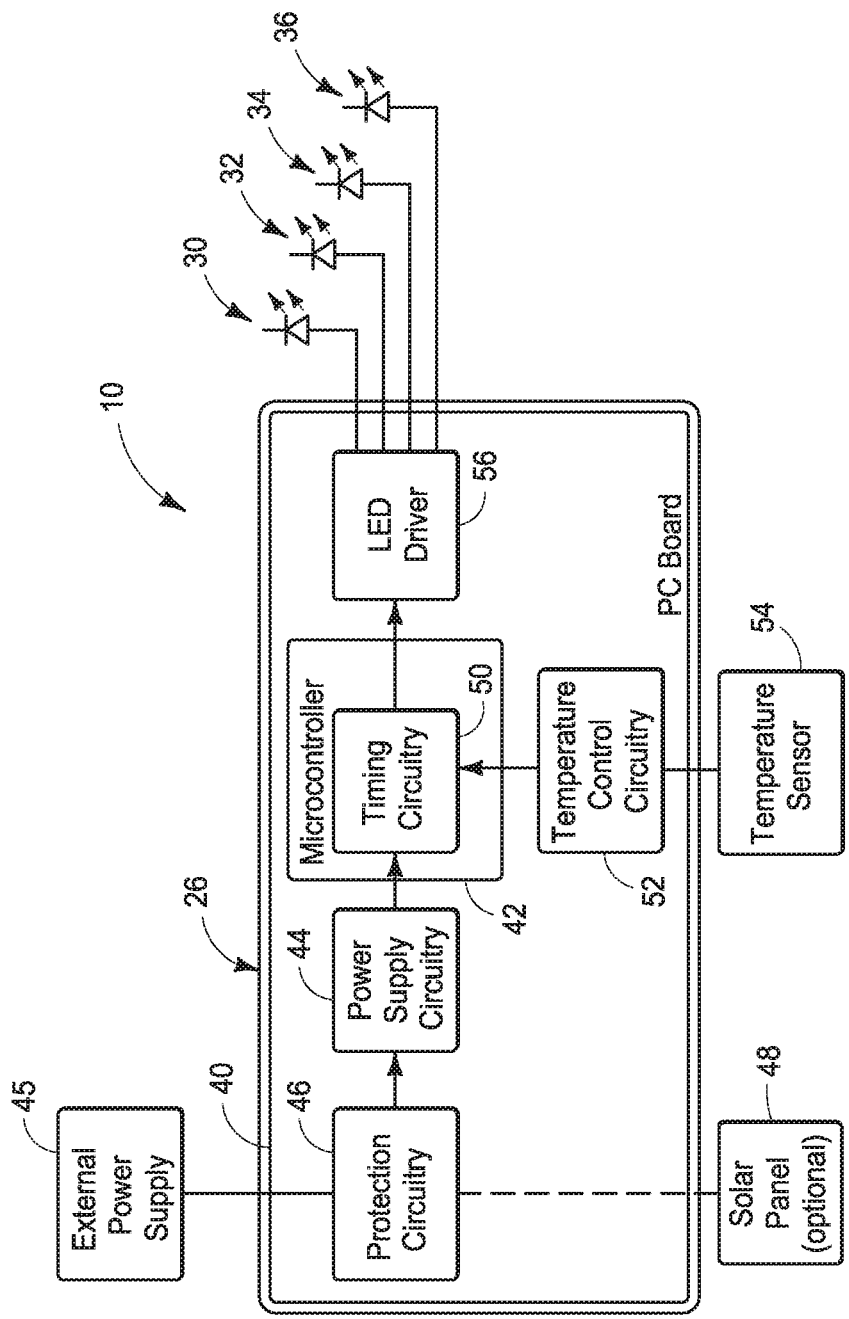
FIG. 3 is a schematic block diagram of a small chewing mammal deterrent apparatus illustrating in block diagram form components of the apparatus.

FIG. 3 illustrates in greater detail features of deterrent apparatus 10. More particularly, deterrent apparatus 10 includes a control housing, or box 26 encasing a printed circuit (PC) board 40. A microcontroller 42 having processing circuitry and memory is provided on PC board 40. Protection circuitry 46 is also provided on PC board 40 in signal communication with power supply circuitry 44 and an external power supply 45, or optionally, solar panel 48 to protect components on PC board 40. In one case, one or more diodes is used to provide overvoltage protection and reverse voltage protection. Optionally, other types of overvoltage protection can be provided. Power supply circuitry 44 provides voltage regulation for microcontroller 42. Furthermore, power supply circuitry 44 can provide voltage regulation for LED driver 56. Power supply 45, in the form of a battery connection lead, a connector, and a battery or optionally a DC external power supply, is coupled to the protection circuitry 46 via the PC board 40. In the case of a battery, the battery is resident off the PC board 40 and the lead is affixed to the PC board 40 and connects to the protection circuitry 46. Alternatively, an AC power supply can be used with a DC output to supply power to apparatus 10.

Microcontroller 42 of FIG. 3 includes timing circuitry 50. Temperature control circuitry 52 communicates with timing circuitry 50 of microcontroller 42, as well as microcontroller 42. An LED driver 56 is provided separately from microcontroller 42 as a result of drive currents needed by LED lights 30, 32, 34 and 36. Driver 56 is an electrical device that regulates the power to the string of LED lights 30, 32, 34 and 36 that are distributed strategically about a location needing illumination. Optionally, microcontroller 42 and driver 56 can take on other alternative and functional configurations. Timing circuitry 50 is configured to deliver a specific timed intermittent delivery of light from LEDs 30, 32, 34 and 36. A temperature sensor 54 is provided in signal communication with temperature control circuitry 52 in order to detect ambient temperature in the location, or environment needing illumination. Optionally, a solar panel 48 can be provided to power battery power supply 44, or to further optionally directly provide a power supply. The addition of a solar panel or an AC-to-DC charger would increase the battery voltage when the engine is running.

It is understood that deterrent apparatus 10 is configured, according to one implementation, to prevent rodent damage to under hood components of vehicles such as cars, pickup trucks, trucks, center pivot irrigation system control boxes, orchard wind machines, windmills, industrial equipment and farm machinery, such as tractors or any equipment that can be potentially damaged by rodents or small chewing mammals. Deterrent apparatus 10 includes multiple light sources, such as LEDs 30, 32, 34, and 36, connected to and powered by a control box, or housing 26 which is connected either to a vehicle battery, or to a battery dedicated to a specific piece of equipment. Apparatus 10 provides a source of light flashes which disturbs rodents and causes them to leave the area, since rodents prefer to occupy dark areas.

Temperature sensor 54 of FIG. 3 is configured to prevent illumination of LEDs 30, 32, 34 and 36 when ambient temperature is detected above a threshold where small chewing mammals and/or rodents cannot tolerate such temperature. One suitable threshold is a temperature of 95 degrees Fahrenheit. In operation, flashing LEDs 30, 32, 34 and 36 are turned off when the area to be protected is above the detected ambient temperature because rats and mice have a thermoregulatory system with a compensatory capacity that causes them to habituate areas with temperatures below 95° F. (35° C.) as a result of their not being able to adapt to high temperatures. This ambient temperature detection feature significantly reduces the overall power requirement of deterrent apparatus 10 and therefore lessens battery drain to help prevent engine starting issues when the battery or batteries used to power the device are also used to start an engine. This feature also helps prevent LED degradation due to such LEDs remaining in operation at high temperatures. Optionally, such temperature threshold can be set higher or lower, or eliminated. For the case where it is eliminated, an increase in power consumption will occur which may not be of concern where deterrent apparatus 10 is powered by a grid-connected AC or DC power supply, such as 120 volt AC power.

For the case of many small chewing mammals, such as rats, mice, and rabbits, these mammals have light and dark adapted eyes that are specifically and more highly sensitive to green light. Small nocturnal chewing mammals' eyes have significantly more rods than cones than some other mammals. Rods are most sensitive to green than other colors of light. Therefore, the use of green light LEDs is more effective for the same amount of lumens produced by a light. Furthermore, disruptive flashing of a light source is more discomforting, disturbing, and/or irritating to such mammals than is a constant white light source. According to one implementation, the duration of the flashes corresponds with Bloch's Law, where there is reciprocity between intensity (I) and time of stimulus duration (T) visually, making it possible to exchange light intensity for the duration and maintain a constant effect from 0.00173 to 0.0518 seconds. The duration of green light flashes use nominal values of 10, 25, or 50 milliseconds. In another case, there is an illumination interval of between 1 and 100 milliseconds and a frequency of between 0.2 and 5 Hertz. Exemplary durations of time between adjacent flashes is 0.2 seconds to 5 seconds, where the green LEDs are turned off include a time duration of between 0.1 and 4.99 seconds between adjacent flashes. Accordingly each flash is made so as to produce as large as possible a disturbing effect while minimizing power required to operate. Furthermore, the use of green light requires significantly less power to produce the same results as white light, for a given lumen, so less energy consumption is required for the deterrent apparatus 10. This benefit lessens drain on a battery power supply, and reduces any potential sulfation of the battery. Finally, the use of at least three light sources in a distributed and dispersed manner provides more uniformly illumination to an area that is to be protected against small chewing mammal, or rodent damage.

Figure 4:
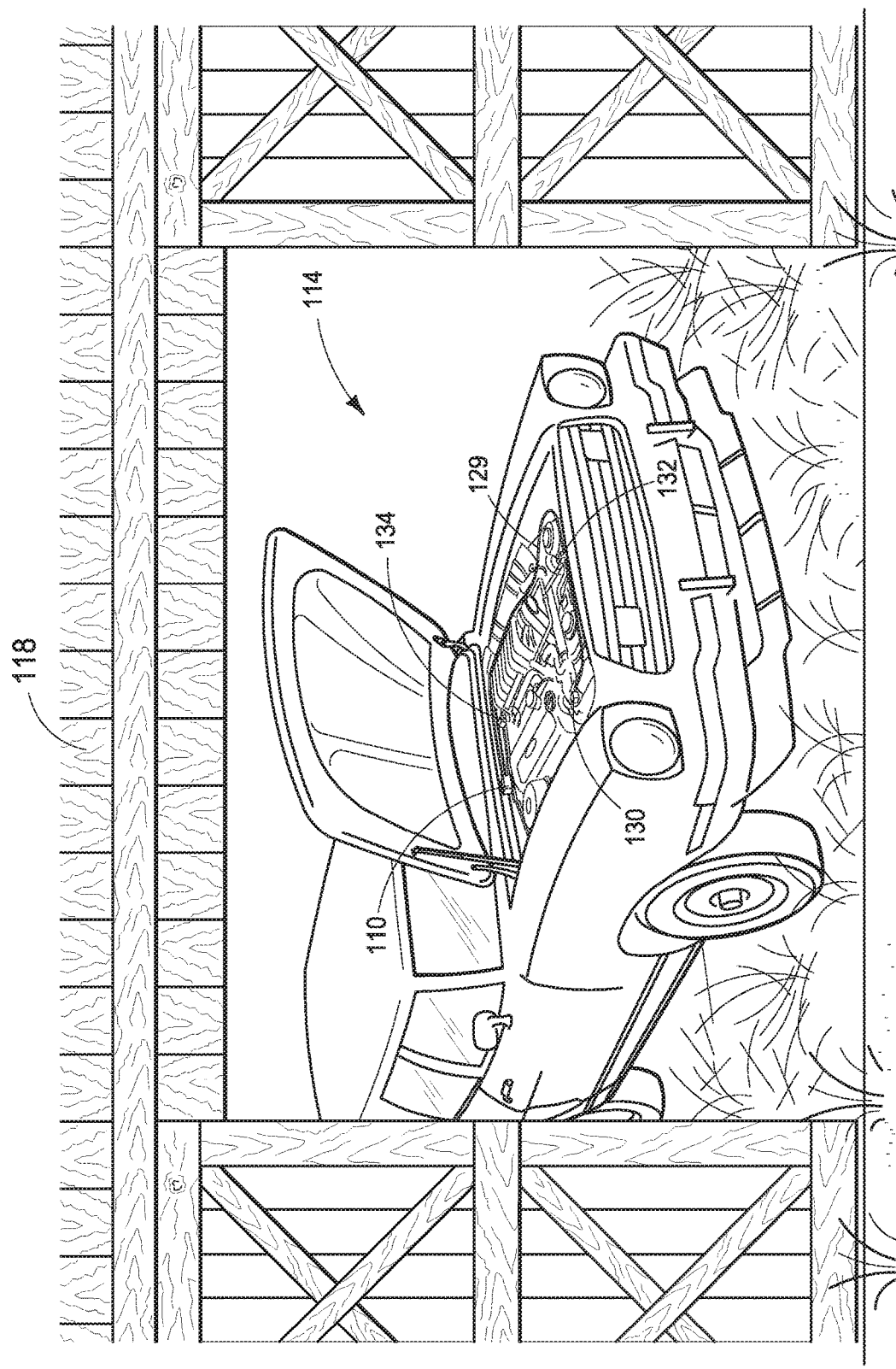
FIG. 4 is a perspective view of another version comprising a vehicle stored in a barn with a small chewing mammal deterrent apparatus and method, illustrating environment according to another implementation.

FIG. 4 illustrates implementation of an alternate configuration small chewing mammal deterrent apparatus 110 configured in another environment of an automobile, or vehicle 114 stored within a barn 118. An array of spaced-apart green light emitting diodes (LEDs) 130, 132, and 134 are distributed within recesses of an engine compartment of vehicle 114 extending along a flexible wiring harness 129 that is secured in a serpentine manner within the engine compartment so as to ensure that LEDs 130, 132, and 134 illuminate fully all recesses within the engine compartment of the vehicle 114.

It is understood that the apparatus of FIGS. 1-3 and FIG. 4 each can be configured to save energy by turning off the LEDs when the engine is running. One implementation uses a subroutine via the microcontroller and does not need any additional hardware. The microcontroller would simply receive a monitoring signal to see if a significant voltage drop has occurred from the battery power supply followed by a detectable immediate increase to approximately 12.9 volts, indicating that the engine has started and is running and detectably evidenced by an increase in battery voltage above a non-running voltage. Detection of a reverse change can be used by the microcontroller to turn on operation of the LEDs.

It is understood that rats reliably choose the lowest light intensities available for their environment, even when all the choices appear to a human to be very dim and are indistinguishable to humans.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A deterrent apparatus for small chewing mammals having open root incisor teeth that continually grow, comprising:
    an array of green light emitting diodes;
    a power supply; and
    control circuitry including
    power conversion circuitry configured to receive power from the power supply,
    timing circuitry coupled between the array of diodes and the power circuitry; and
    temperature sensor circuitry to enable the operation of the timing circuitry when the ambient temperature is below a threshold temperature determined based on the small chewing mammals;
    the timing circuitry configured to intermittently turn on and off the array of green light diodes at short intervals with a pulse duration of 10-50 milliseconds and a pulse frequency of 0.2-5 Hertz to provide a constant photoreceptor effect from 0.00173 to 0.0518 seconds and generate a response in the ocular rod cells of small chewing mammals that annoys small chewing mammals.

2. The rodent deterrent apparatus of claim 1, further comprising a temperature sensor coupled with the control circuitry and configured to measure ambient temperature, the control circuitry configured to disable operation of the array of green light diodes when the ambient temperature is detected above a specified temperature that exceeds compensatory capacity for a small chewing mammal's thermoregulatory system.

3. The rodent deterrent apparatus of claim 2, wherein the control circuitry is configured to enable operation of the array of green light emitting diodes below a temperature of 95 degrees Fahrenheit and disable operation when the temperature is at least 95 degrees Fahrenheit.

4. The rodent deterrent apparatus of claim 1, wherein the duration of illumination of green light flashes is in the range of 1 to 100 milliseconds.

5. The rodent deterrent apparatus of claim 1, wherein the timing between flashes is made so as to produce as large as possible a response in the ocular rod cells of small chewing mammals that annoys small chewing mammals as one of a physical irritant and a psychological irritant while minimizing power required to operate the apparatus.

6. The rodent deterrent apparatus of claim 1, wherein the duration of the flashes follows Bloch's Law, where there is reciprocity between visual intensity (I) and time of stimulus duration (T), configured to exchange light intensity for the time duration to maintain a threshold illumination level having luminance of the light emitting diodes emitting flashes at short intervals with the integral of the pulse being the threshold intensity that provides a constant photoreceptor effect from 0.00173 to 0.0518 second.

7. The rodent deterrent apparatus of claim 1, wherein the array comprises at least three green light emitting diodes configured to illuminate in a distributed way the area to be protected against rodent damage.

8. The rodent deterrent apparatus of claim 1, wherein the power supply comprises a battery.

9. The apparatus of claim 1, wherein the power supply comprises one of: a solar panel and a wind generation machine.

10. A deterrent apparatus for small chewing mammals, comprising:
    a distributed array of green light emitting diodes (LEDs);
    a power supply; and
    control circuitry including timing circuitry, temperature control circuitry, and an LED driver; the timing circuitry coupled between the array of diodes and the power supply, and the LED driver coupled between the LEDs and the timing circuitry and configured to maintain substantially constant power delivery to each of the LEDs; and
    the temperature control circuitry configured to enable the operation of the timing circuitry when the ambient temperature is below a threshold temperature determined based on the small chewing mammals;
    the timing circuitry configured to enable the array of green light diodes to intermittently illuminate at short intervals with a pulse duration of 10-50 milliseconds and a pulse frequency of 0.2-5 Hertz to provide a constant photoreceptor effect from 0.00173 to 0.0518 seconds and generate a response in the ocular rod cells of small chewing mammals that annoys small chewing mammals.

11. The apparatus of claim 10, wherein the control circuitry is configured to illuminate the LEDS with an illumination interval of between 1 and 100 milliseconds.

12. The apparatus of claim 11, wherein the control circuitry is configured to illuminate the LEDS with an illumination frequency of between 0.2 and 5 Hertz.

13. The apparatus of claim 10, wherein the power conversion circuitry comprises timing circuitry configured to intermittently illuminate and deluminate the array of green LEDs.

14. The apparatus of claim 10, further comprising power protection circuitry comprising a DC power supply power protection circuit.

15. The apparatus of claim 10, wherein the power supply comprises a battery.

16. The apparatus of claim 10, wherein the power supply comprises a solar panel and a battery.

17. A method is provided for deterring small chewing mammals, comprising:
providing an array of green light emitting diodes (LEDs), a power supply, and control circuitry including temperature sensor circuitry and timing circuitry;
distributing the array of green light emitting diodes (LEDs) in an environment having equipment at risk of chewing damage from small chewing mammals;
enabling with the temperature sensor circuitry the operation of the timing circuitry when the ambient temperature is below a threshold temperature determined based on the small chewing mammals; and
enabling with the timing circuitry the operation of the array of green light diodes to illuminate at short intervals with a pulse duration of 10 to 50 milliseconds and a pulse frequency of 0.2 to 5 Hertz to provide a constant photoreceptor effect from 0.00173 to 0.0518 seconds and generate a response in the ocular rod cells of small chewing mammals that annoys small chewing mammals.

18. The method of claim 17 further comprising providing a temperature sensor provided in the environment and detecting a threshold temperature.

19. The method of claim 18, further comprising activating and deactivating the control circuitry to illuminate the LEDs responsive to the temperature control circuitry when temperature is detected below the threshold temperature.

20. The method of claim 19, wherein the power supply comprises a battery, and further comprising providing a solar panel, and capturing energy with the solar panel and storing the energy in the battery.

\* \* \* \* \*